July 30, 1968 J. K. LA FLEUR 3,394,555
POWER-REFRIGERATION SYSTEM UTILIZING WASTE HEAT
Filed Nov. 10, 1964 2 Sheets-Sheet 1

JAMES K. LA FLEUR
INVENTOR.

BY Max Gelder

ATTORNEY

United States Patent Office 3,394,555
Patented July 30, 1968

3,394,555
POWER-REFRIGERATION SYSTEM UTILIZING WASTE HEAT
James K. La Fleur, Hermosa Beach, Calif., assignor, by mesne assignments, to McDonnell Douglas Corporation, Santa Monica, Calif., a corporation of Maryland
Continuation-in-part of application Ser. No. 331,494, Dec. 18, 1963. This application Nov. 10, 1964, Ser. No. 410,222
16 Claims. (Cl. 62—29)

ABSTRACT OF THE DISCLOSURE

This invention is directed to the use of waste heat produced in a magnetohydrodynamic power generator, in a power-refrigeration system which according to one embodiment, involves heating compressed helium with the hot combustion gases from such generator, expanding such hot compressed helium and utilizing the power to compress the helium, circulating a part of the compressed helium in a refrigeration cycle, cooling and expanding a first portion of such helium refrigerant and utilizing such refrigerant for separating oxygen from air, circulating such oxygen to the magnetohydrodynamic power generator to support combustion therein, further cooling and expanding a second portion of the compressed cooled helium to a lower temperature, passing such cooled second portion of helium into heat exchange relation with the magnets of said power generator, and recompressing said first and second portions of helium.

---

Figure 1:
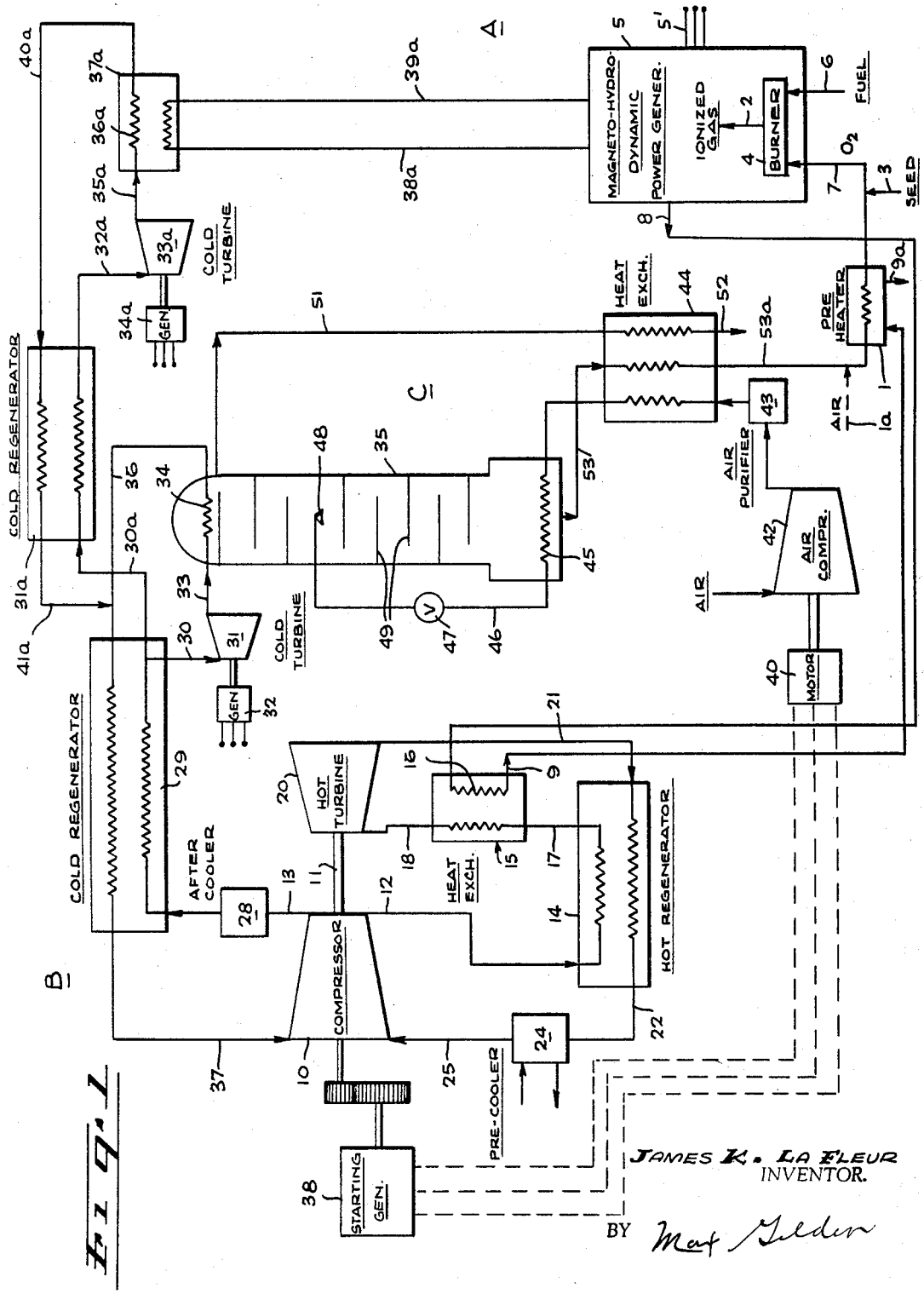

This application is a continuation-in-part of my copending application Ser. No. 331,494, filed Dec. 18, 1963, now Patent No. 3,241,327 which in turn is a continuation-in-part of my copending applications Ser. Nos. 87,311, filed Feb. 6, 1961, now abandoned; 273,883, filed Apr. 18, 1963, now Patent No. 3,258,929; and 318,564, filed Oct. 24, 1963, now Patent No. 3,194,026.

This invention relates to the utilization of waste heat from hot gaseous reaction or combustion products, and is particularly concerned with the use of waste heat produced in magnetohydrodynamic power generators and other systems, in a power-refrigeration process for producing refrigerant employed in the separation of oxygen from air, and for producing additional refrigerant at very low temperatures, said oxygen and said additional low temperature refrigerant preferably being employed in such systems or magnetohydrodynamic power generators.

In my above-noted copending applications, Ser. Nos. 87,311 and 318,564, particularly Ser. No. 87,311, there is disclosed a power-refrigeration system employed in conjunction with, and for the operation of, an air separation process, said air separation process being further described in Ser. No. 273,883. Such system requires the use of heat for the operation of the power and refrigeration cycles to produce a refrigerant required in the air separation unit for producing oxygen.

Copending application Ser. No. 331,494 describes a system for utilizing waste heat, e.g., from the combustion products of a chemical process, in a power-refrigeration system as described in above applications Ser. Nos. 87,311 and 318,564, for liquefying air and separating oxygen therefrom, e.g., as described in above application Ser. No. 273,883, and circulating such oxygen for use in the waste heat producing process.

A magnetohydrodynamic (MHD) power generator is a device which converts heat directly to electricity through the medium of a high velocity high temperature ionized gas stream moving through a magnetic field. In such devices the working fluid or gas comprises combustion products at very high temperature. This device has substantial advantages for commercial power generation in that its output is very great relative to its size. However, due to the fact that the gas stream must be ionized, and high temperature combustion products are used, the gas stream exiting the MHD power generator is generally in excess of about 3000° F. This necessitates a second heat recovery system to remove the heat energy from the 3000° F. level down to near ambient temperatures. Further, in order to attain the very high combustion temperatures required in this system, fuels must be burned therein employing higher oxygen content than is present in atmospheric air. Thus, the principles of my copending application Ser. No. 331,494 are applicable to a waste heat producing system such as a magnetohydrodynamic power generator for supplying the oxygen required therein.

However, the magnets of the magnetohydrodynamic power generator must have very high field strength and low power consumption. This necessitates the use of superconducting magnets which must be refrigerated to a very low temperature, preferably near the boiling point of liquid helium. Hence, in addition to the requirement for a substantial supply of oxygen or oxygen-enriched air for combustion, such a system requires a refrigerant of very low temperature for cooling the magnets to a sufficiently low temperature for efficient operation of the magnetohydrodynamic power generator.

It is an object of the invention to utilize the waste heat from a chemical process or from a system, as a source of power for separation of a gas component from a gas mixture, said gas component being employed in said chemical process or system to carry out a reaction therein, and for producing a low temperature refrigerant.

Another object of the invention is to employ the waste heat from a chemical process or from a system which utilizes oxygen for combustion, as a source of power for the separation of air to produce oxygen, and for the production of very low temperature refrigeration.

Another object is the provision of a process or system employing such waste heat for the operation of a power-refrigeration process and an air separation process for production of oxygen and for production of a very low temperature refrigerant gas, and utilizing such oxygen and such low temperature refrigerant gas for operation of the system supplying such waste heat.

A still further and particular object is to provide a system which includes a magnetohydrodynamic power generator, and which utilizes waste heat from such generator to power a refrigeration cycle employing a gaseous medium having a very low critical temperature and boiling point, preferably helium, and in turn to employ the refrigerant produced therein in an air separation cycle to produce the oxygen employed for combustion in such magnetohydrodynamic power generator, and also to produce refrigerant gas or helium at very low temperature for efficient cooling of the magnets of such generator.

Other objects and advantages will in part be apparent and in part be obvious from the following description of the invention.

The instant invention is based on the concept that a portion of the refrigerant, e.g., helium, in the power-refrigeration system of the above copending applications, which employs as a source of power the waste heat from a system, particularly a magnetohydrodynamic power generator, can be supplied at a sufficiently low temperature, e.g., about 140° R. (Rankine), to operate an air separation system to produce oxygen, and a portion of such refrigerant, e.g., helium, can be further cooled and expanded to produce a very low temperature refrigerant, e.g., at about 7° R., to supply the oxygen for combustion and to supply the necessary low temperature refrigeration for the super-conducting magnets of the magnetohydrodynamic power generator.

As previously noted, in preferred practice the waste heat from a system such as a magnetohydrodynamic power generator, e.g., in the form of hot combustion gases, is passed into heat exchange relation with the hot compressed gas, e.g., helium, in the process of the above copending applications, which functions both as power and refrigerating medium in such process, to further heat such hot compressed gas, and the resulting hot gas is fed into the hot power turbine of the system to provide the major portion of the power required initially to compress such power fluid and refrigerating fluid medium. A part of such compressed fluid is cooled and expanded in the refrigerating cycle to provide a refrigerant gas, e.g., helium, at low temperature. A portion of such refrigerant is passed into the upper end of a fractionating column employed in the process of air separation described in Ser. Nos. 87,311 and 273,883, for producing liquid oxygen in the lower portion of the tower. Oxygen withdrawn from the bottom of such column is then circulated to such system or magnetohydrodynamic power generator from which the waste heat was initially derived, and is used to support combustion therein for providing the hot combustion gases required in such system. The remaining portion of such cooled and expanded refrigerant is taken as a side stream and is further cooled and expanded to produce a refrigerant at very low temperatures which is passed into heat exchange relation with the superconducting magnets of the magnetohydrodynamic power generator, for cooling such magnets.

In accordance with the instant invention, by using the waste heat from a magnetohydrodynamic power generator system as power for a combined refrigeration-air separation process, and utilizing the oxygen so separated in such system, such oxygen can be produced much more cheaply than ordinary oxygen supplied to such process or system from an extraneous source, due to the utilization of the waste heat in producing the oxygen, and at the same time a refrigerant at very low temperatures can be supplied by the power-refrigeration system for concurrent use in said system. A particularly important advantage of the instant invention process and system is that by combining the operations for the separation of air and production of oxygen, and for supplying a refrigerant, e.g., helium, at very low temperature, since said magnetohydrodynamic power generator system requires such oxygen and low temperature refrigerant in its operation, a continuous and uninterrupted supply of oxygen and low temperature refrigerant are available for such process or system, without dependence on outside sources of these materials.

An additional important advantage of the invention is that additional electric power can be generated during expansion and cooling of the refrigerant, e.g., helium, in the power-refrigeration system.

Still another important advantage of the invention process is the production of other gases such as nitrogen and argon in the air separation process, which can be marketed commercially, thus effecting a still further economy in the primary production of oxygen for utilization in the process or system furnishing the waste heat.

The principles of the invention, and the greatest advantages thereof, are derived when the waste heat utilization concept hereof is applied to the power-refrigeration operation in conjunction with the air separation operation described in my above copending applications and in detail below. Due to the efficiency of such operations and the ease and economy with which they are carried out, and the relatively small amount of equipment required therein, these operations or systems can be readily applied for the utilization of the waste heat and the production of oxygen and very low temperature refrigerant, preferably helium, for supplying the waste heat-producing system or magnetohydrodynamic power generator, at a substantially reduced cost per ton of oxygen and of such refrigerant. Further, the equipment required to carry out such power-refrigeration and air separation operations is compact and can be readily installed at the site of the process or system producing the waste heat.

Figure 2:
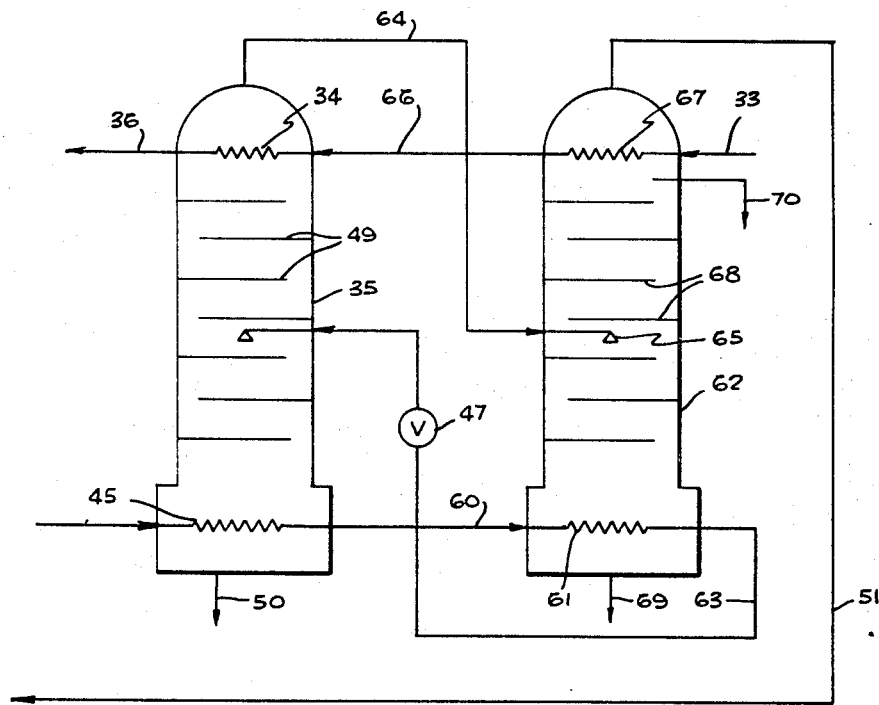

The invention will be more readily understood by the description below of certain embodiments of the invention taken in connection with the accompanying drawing, wherein:

FIG. 1 is a schematic drawing or flow sheet of a preferred embodiment of the invention; and FIG. 2 is a schematic representation of a modification of the system of FIG. 1.

Referring to FIG. 1 of the drawing, A, B and C represent the combined units of the system, A being the waste heat-producing system in the form of a magnetohydrodynamic power generator, B the power-refrigeration unit, and C the air separation unit. Referring to unit A, the numeral 5 represents a magnetohydrodynamic power generator. Fuel, e.g., powdered coal, is introduced at 6 into a burner 4 which is incorporated in the magnetohydrodynamic power generator, and oxygen or air enriched with the oxygen produced in the air separation system described below, and which is preferably preheated, is introduced through line 7 into burner 4 to support the combustion of the fuel. The hot, gaseous reaction products produced in the burner 4 and which are at temperature of the order of about 5,000° to about 6,000° F., are ionized by the presence of an alkaline seed material (an ionizable impurity) such as $K_2CO_3$, and the resulting ionized gas stream at 2 traverses the magnetic field of the superconducting magnets (not shown) of the magnetohydrodynamic power generator, to generate a high output of electric power at 5'. The seed material in minor amounts can be injected at 3 into the incoming oxygen stream 7 before it is blown into the burner. The magnetohydrodynamic power generator construction and its mode of operation are known in the art and form no part of the present invention. Such a system is described in the article "Physical Principles of Magnetohydrodynamic Power Generation," by Richard J. Rosa, "Physics of Fluids," vol. 4, No. 2, page 182, February 1961, and in the article "Progress in MHD Power Generation," by T. R. Brogan et al.

The exiting combustion gases at a temperature between about 3,000° F. and about 3,500° F. are conducted through a conduit 8 into the coil 16 of a heat exchanger 15, the exiting reaction products being vented through a conduit 9, and employed preferably for preheating oxygen or oxygen-enriched air entering the MHD generator, as described more fully below. In the heat exchanger 15, the hot reaction products from the generator 5 pass in counter-current heat exchange relation with the power supplying medium or gas, preferably helium, of a power-refrigeration system B described below for heating of such medium to high temperature prior to passage thereof into a prime mover.

Referring now to the power and refrigeration cycle B in which the waste heat from the hot reaction gases passing through the heat exchanger 15 is utilized for producing power for supplying a refrigerant at sufficiently low temperatures to the air separation process, and a refrigerant at very low temperature to the magnetohydrodynamic power generator, the working gas medium for both the power and refrigeration cycles should have a very low critical temperature and very low boiling point at atmospheric pressure. Thus, according to the instant process, it is preferred to employ hydrogen, helium or neon as the working gas medium, although other gases can be employed, if desired. In the instant process, the system will be described as using helium as a working gas medium for both the power and refrigeration cycles.

Assuming the whole system of power and refrigeration has been in operation for sufficient time to reach the intended operating conditions of temperature and pressure, in a typical operation helium enters a compressor turbine 10 at a pressure of 181 p.s.i. and a temperature of 530°

R. (Rankine). Helium is discharged from the high-pressure side of the compressor at 268 p.s.i. and 618° R. The flow from the compressor outlet is divided into two high-pressure side streams, namely, a power stream which flows through one branch 12 or power loop and a refrigeration stream which flows through another branch 13 or refrigeration loop. The high-pressure side of the power stream or the hot stream first passes through one side of a regenerator 14, which is the power or hot regenerator, wherein it is heated to an exiting temperature of 1,493° R. From the regenerator the high-side power stream passes through a conduit 17 and through the above-noted heat exchanger 15 in countercurrent relation to the hot reaction gases from the magnetohydrodynamic power generator at 5. The hot gas exiting the heat exchanger 15 is at a temperature of 1,660° R. and is conducted through a conduit 18 into a hot turbine 20 which can provide all or a major portion of, the power for driving the compressor 10 via the connecting shaft 11. The gas expands and cools in the turbine, the pressure dropping to 190 p.s.i. and the temperature dropping to 1,498° R., and then passes via conduit 21 through the low-pressure side of the hot regenerator 14 wherein it is cooled while heating the power stream in countercurrent flow thereto. The cooled gas exiting the hot regenerator then passes via a conduit 22 through a pre-cooler 24 from which it is returned via line 25 to the compressor 10. The pre-cooler may be water- or air-cooled and serves to bring the working medium down to ambient temperature. The above-described circuit constitutes the power cycle of the power-refrigeration system indicated at B in FIG. 1 of the drawing.

The cold or refrigeration stream that flows through conduit 13 passes first through an after-cooler 28 where it is cooled to 530° R., the pressure drop being slight, about 5 p.s.i. The stream then passes through a regenerator 29, the cold regenerator, where it is cooled to about 141° R. A portion of the cooled gas emerging from regenerator 29 passes through conduit 30 into a turbine 31, referred to as the cold turbine, wherein the gas expands with a drop in temperature to 128° R. The cold turbine 31 drives a generator indicated generally at 32 for producing additional electric power. If desired, turbine 31 alternatively can serve as a source of additional power to the compressor 10 via a shaft connecting said compressor and turbine 31. The cooled expanded low-pressure stream of helium then passes via conduit 33 through a coil 34 at the top of a fractionating column 35 of the air separation unit C described below, for producing oxygen fed via line 7 to the magnetohydrodynamic power generator. From coil 34 the low-pressure helium returns via conduit 36 to the cold regenerator 29 where it serves to cool the helium prior to its passage to the cold turbine 31.

Referring now to the air separation unit of the system, indicated generally at C in the drawing, atmospheric air is drawn into a rotary compressor 42 driven by the motor 40 wherein the air is compressed to approximately 45 p.s.i. and then flows through the air purifier 43 to remove contaminants such as carbon dioxide, sulfur and water. The compressed, purified air then flows to a regenerative heat exchanger or pre-cooler 44 where the air is cooled to about 177° R. by the counter-passage of the oxygen withdrawn at 53 from the bottom of fractionating column 35, and the nitrogen-containing gas leaving at 51 the top of column 35, as will be described hereinafter. The air stream exiting the regenerative heat exchanger 44 is now chilled to near its condensation point. The so-cooled air is then passed through the reboil coil 45 in the bottom of the fractionating column 35 wherein the air is condensed to liquid form and the liquid air emerges from coil 45 at a temperature of about 163° R. The heat necessary to be removed from the air passing through coil 45 to accomplish the condensation of the air therein is removed by the boiling of the liquid oxygen which accumulates in the bottom of column 35.

The liquid air is then conducted through a conduit 46 and passed through an expansion valve 47 into the column 35 at 48, where it is permitted to expand to substantially atmospheric pressure. The liquid air is introduced into the column 35 at approximately midway of the top and bottom of the column, and at a point corresponding substantially to the composition of air in the column. The fractionating column 35 may be of conventional design, having means (not shown in detail) such as bubble cap trays 48, to bring the gas passing upward in the column and through the bubble cap trays into intimate contact with reflux liquid passing downward, over and through the trays therein. The column 35 is operated close to, but somewhat above, atmospheric pressure. The refrigeration provided by the cold coil 34 at the top of the column, through which the low-temperature helium passes, as described above, liquefies some of the nitrogen to provide the necessary reflux to keep the column operating, while the boiling oxygen which collects at the bottom of the column provides ascending vapors for upward passage into contact with the descending liquid at the various bubble cap trays 49. This results in the fractional distillation and separation of the air into oxygen in liquid form at the bottom of the column and a nitrogen-argon gaseous mixture which is withdrawn at the top of the column. Such nitrogen-argon mixture passes through conduit 51 and through the heat exchanger 44 in counter-current relation with respect to the compressed incoming air to cool the same, and the exiting nitrogen-argon mixture is withdrawn at 52.

Oxygen is withdrawn at 53 from the bottom of column 35 and is warmed by passage of the gas through the heat exchanger 44 to further aid in the cooling of the incoming compressed air. The warmed exiting oxygen gas from the heat exchanger 44 is then conducted via the conduit 53a through a preheater 1, to heat the oxygen to a temperature of about 1,500° to about 3,000° F., and the preheated oxygen is then conducted via the conduit 7 to the burner 4 in the magnetohydrodynamic power generator 5 of unit A. Combustion products exiting the heat exchanger 15 are conducted through line 9 to preheater 1 for heating the incoming oxygen, and the cooled combustion gases exit at 9a. The oxygen entering burner 4 can be used alone, or if desired, it can be mixed with air, e.g., at 1a, to provide an oxygen-enriched air, for carrying out the combustion of the fuel in 4, thus completing a portion of the cycle of operations of the invention system.

The remaining portion of the cooled helium gas emerging from cold regenerator 29 passes through conduit 30a into a second cold regenerator 31a, wherein the helium is cooled down to about 8° R. The exiting helium then passes through a conduit 32a into a turbine 33a connected to a generator 34a for producing additional electric power. If desired turbine 33a alternatively can be connected to compressor 10 to serve as an additional source of power therefor. The thus further cooled and expanded low pressure helium, now at a low temperature of about 7° R., then is conducted via a conduit 35a to the coil 36a of a heat exchanger 37a connected to the magnetohydrodynamic power generator 5, wherein the helium passes in heat exchange relation with another portion of helium gas which circulates via lines 38a and 39a to the exchanger 37a and then in heat exchange relation with the superconducting magnets (not shown) of the generator 5. However, if desired, the refrigerant helium in conduit 35a can be circulated directly to the magnetohydrodynamic generator 5, and circulated through tubes (not shown) in intimate contact with the magnet coils. From coil 36a, or following passage of the refrigerant helium in heat exchange relation with the magnet coils of the MHD, the low pressure and low temperature helium returns via conduit 40a to the second cold regenerator 31a where it serves to cool the helium prior to its passage to the second cold turbine 33a. The warmed helium exiting the cold regenerator 31a is then conducted via conduit 41a into conduit 36, and is mixed therein with the helium returning from coil 34 at the top of air fractionating column 35, and the resulting mixture is passed through cold regenerator 29, as previously noted.

The warmed helium exiting the cold regenerator 29 then returns via conduit 37 to the compressor 10 at ambient temperature and compressor inlet pressure of 181 p.s.i., thus completing the refrigeration loop of the power-refrigeration system indicated at B in the drawing. Initially, to place the power-refrigeration system in operation, a starter generator unit 38 driven by motor 40 is employed until the system reaches a point where it is thereafter self-sustaining.

This completes the entire cycle of operation of the invention system wherein waste heat is produced by the magnetohydrodynamic power generator indicated at unit A, in combination with the power-refrigeration unit indicated at B for the use of such waste heat to produce cooled helium at 34, for the air separation process indicated at C for producing the oxygen employed in A, and to produce helium at a very low temperature at 36a for cooling the superconducting magnets of unit A. In addition to the electric power generated by the MHD power generator, additional electric power can be obtained from the cold turbines 31 and 31a in the power-refrigeration system B.

If desired, and in order to provide further economies in connection with the overall process herein described, the nitrogen-argon mixture withdrawn from the top of the fractionating column at 51 can be processed further to separate the components of such mixture.

Referring to FIG. 2 of the drawing, illustrating the separation of air into all three of its components, oxygen, nitrogen and argon, the same numerals are employed in FIG. 2 as in FIG. 1 to represent the same parts as described above in connection with FIG. 1.

In the modification of FIG. 2, the air separation unit C is designed so that the compressed and pre-cooled air passes first through the reboil coil 45 in fractionating column 35 and then via conduit 60 into the reboil coil 61 at the bottom of a second fractionating column 62, liquid air at about 163° R. emerging from the last coil 61. The liquid air is then conducted via conduit 63 and metered into the first column 35 via expansion valve 47, as previously described. The passage of air through the reboil coil 61 following its passage through reboil coil 45 of column 35, is required to supply heat to the bottom of the column 62 and to the liquid argon collected therein, as described below.

In FIG. 2, the mixture of nitrogen and argon gas withdrawn from the top of column 35 is fed via conduit 64 into the second fractionating column 62 substantially midway between the top and bottom thereof and substantially at the point corresponding to the composition of this gas mixture in column 62, the gas being introduced into column 62 via the distributor 65. In order to carry out fractionation in both columns 35 and 62, the helium refrigerant passes first through the refrigerating coil 67 in the upper end of fractionating column 62, the argon column, and then is conducted via line 66 into refrigerating coil 34 at the top of the column 35, the oxygen column. Thus, in the columns the flow of the refrigerant is countercurrent to the flow of incoming air to the bottom of the columns.

Fractionating column 62 is of substantially the same construction as column 35, containing bubble cap trays, as at 68, and operates in substantially the same manner as column 35, for separation of nitrogen and argon. The argon liquefies and collects in the bottom of the column for removal through conduit 69. A large proportion of the nitrogen is liquefied by the cold coil 67 at the top of the column, and the liquid nitrogen is removed by conduit 70. The remaining nitrogen gas is removed as overhead from the top of column 62, and is passed via conduit 51 through heat exchanger 44, as described above.

From the foregoing, it is seen that the invention provides a novel and valuable system for furnishing oxygen and very low temperature refrigerant at a low cost to a system, particularly a magnetohydrodynamic power generator, without the danger or inconvenience of any interruption in the supply of such materials required, by utilizing the waste heat of such system for supplying the power to produce such oxygen and low temperature refrigerant, in operations which are directly connected to the system.

Although the invention has been described in terms of, and is particularly applicable to, operation of a magnetohydrodynamic power generator, the principles of the invention can be applied broadly for supplying refrigerant, preferably low temperature refrigerant gas, at two or more different temperature levels to separate refrigeration loads of any desired type. Further, if desired, according to the invention principles, in the system described above and shown in FIG. 1 of the drawing, a portion of the low temperature refrigerant at 32a can be diverted and passed through a third cold regenerator and a third expander or cold turbine to produce refrigerant at a temperature level lower than the refrigerant at 35a.

While I have described particular embodiments of my invention for the purpose of illustration, it should be understood that various modifications and adaptations thereof may be made within the spirit of the invention, as set forth in the appended claims.

I claim:

1. A process which comprises passing hot gaseous reaction products into heat exchange relation with a compressed gas having a boiling point at atmospheric pressure lower than the boiling point of oxygen, said compressed gas flowing in a closed power loop, introducing said hot compressed gas into a prime mover and expanding said gas, cooling said gas, compressing said gas, circulating a part of said compressed gas as refrigerant in a closed refrigeration loop, cooling said refrigerant, expanding a first portion of said cooled refrigerant and cooling same to a first low temperature, passing said first portion of cooled refrigerant in heat exchange relation with a first medium to cool same, subjecting a second portion of said cooled refrigerant to further cooling, expanding said further cooled second portion of refrigerant and cooling same to a second low temperature below said first low temperature, passing said second portion of cooled refrigerant in heat exchange relation with a second medium to cool same, heating said first and second portions of said refrigerant following passage thereof into heat exchange relation with said first and second media, and recompressing said first and second portions of refrigerant.

2. A process which comprises compressing substantially a gaseous refrigerant having a boiling point at about atmospheric pressure lower than the boiling point of oxygen, dividing the compressed gas into a first stream and a second stream, passing hot gaseous products from a waste heat producing system into heat exchange relation with said compressed first stream to raise the temperature thereof substantially, allowing the heated first stream to expand and deriving mechanical energy therefrom to provide power required to compress the gas, cooling the second stream of refrigerant, expanding a first portion of said cooled second stream of refrigerant and cooling same to a first low temperature below the boiling point of oxygen, passing said first portion of cooled second stream of refrigerant in heat exchange relation with a first medium to cool same, subjecting a second portion of said cooled second stream of refrigerant to further cooling, expanding said further cooled second portion of the second stream of refrigerant and cooling same to a second low temperature below said first low temperature, utilizing the resulting heated first portion of said second stream of refrigerant for the first-mentioned cooling of said second stream of refrigerant, and utilizing the resulting heated second portion of the second stream of refrigerant for the first mentioned cooling of said second portion of said second stream of refrigerant, and recompressing said first and second portions of refrigerant.

3. The process of claim 2 wherein said gaseous refrigerant is helium, said first medium is air for liquefaction thereof and said second medium is the magnets of a magnetohydrodynamic power generator, the oxygen component of said liquefied air being employed to support combustion for producing an ionized gas employed in said magneto-hydrodynamic power generator.

4. A process which comprises passing hot gaseous products into heat exchange relation with compressed gas to heat same, introducing said hot compressed gas into a prime mover for compression of the refrigerant helium, cooling said helium, expanding a first portion of said cooled helium and cooling same to a first low temperature, passing said first portion of cooled helium in heat exchange relation with a first medium to cool same, subjecting a second portion of said cooled helium to further cooling, expanding said further cooled second portion of helium and cooling same to a second low temperature below said first low temperature, passing said second portion of cooled helium in heat exchange relation with a second medium to cool same, heating said first and second portions of helium following passage thereof into heat exchange relation with said first and second media, and recompressing said first and second portions of helium, said first medium being air for liquefaction thereof and said second medium being the magnets of a magneto-hydrodynamic power generator, the oxygen component of said liquefied air being employed to support combustion for producing an ionized gas employed in said magnetohydrodynamic power generator.

5. A process for utilizing waste heat from a magnetohydrodynamic power generator producing hot gaseous waste products, which comprises passing said hot gaseous products into heat exchange relation with a compressed gas to heat same, introducing said hot compressed gas into a prime mover for compression of a refrigerant, compressing said refrigerant, expanding said compressed refrigerant and cooling same to a low temperature, and passing said cooled refrigerant in heat exchange relation with the magnets of said magnetohydrodynamic power generator to cool same.

6. A process for utilizing waste heat from a magnetohydrodynamic power generator producing hot, gaseous waste products which comprises compressing substantially a gaseous refrigerant medium having a boiling point at about atmospheric pressure lower than the boiling point of oxygen, dividing the compressed medium into a first stream and a second stream, passing said hot, gaseous products from said generator into heat exchange relation with said first stream to raise the temperature thereof substantially, allowing the heated first stream to expand and deriving mechanical energy therefrom to provide power required to compress the medium, cooling the second stream, expanding and further cooling said stream to a low temperature, and passing said expanded and cooled stream into heat exchange relation with the magnet coils of said magnetohydrodynamic power generator to cool same.

7. A process for utilizing waste heat from a system employing oxygen for operation and producing hot gaseous waste products, which comprises passing said hot gaseous products into heat exchange relation with a compressed gas to heat same, introducing said hot compressed gas into a prime mover for compression of a refrigerant, compressing said refrigerant, cooling said refrigerant, expanding a first portion of said cooled refrigerant and cooling same to a first low temperature below the boiling point of oxygen at about atmospheric pressure, passing said first portion of cooled refrigerant in heat exchange relation with air and condensing oxygen from said air, and introducing said oxygen into said system producing said hot gaseous waste products, subjecting a second portion of said cooled refrigerant to further cooling, expanding said further cooled second portion of refrigerant and cooling same to a second low temperature below said first low temperature, passing said second portion of cooled refrigerant in heat exchange relation with a medium to cool same, heating said first and second portions of said refrigerant following passage thereof into heat exchange relation with said air and said medium, and recompressing said first and second portions of refrigerant.

8. A process for utilizing waste heat from a magnetohydrodynamic power generator employing oxygen for operation and producing hot gaseous waste products, which comprises passing said hot gaseous products into heat exchange relation with a compressed gas to heat same, introducing said hot compressed gas into a prime mover for compression of a refrigerant, compressing said refrigerant, cooling said refrigerant, expanding a first portion of said cooled refrigerant and cooling same to a first low temperature below the boiling point of oxygen at about atmospheric pressure, passing said first portion of cooled refrigerant in heat exchange relation with air and condensing oxygen from said air, and introducing said oxygen into said magnetohydrodynamic power generator producing said hot gaseous waste products, subjecting a second portion of said cooled refrigerant to further cooling, expanding said further cooled second portion of refrigerant and cooling same to a second low temperature below said first low temperature, passing said second portion of cooled refrigerant in heat exchange relation with the magnet coils of said magnetohydrodynamic power generator to cool same, heating said first and second portions of said refrigerant following passage thereof into heat exchange relation with air and said magnet coils, and recompressing said first and second portions of refrigerant.

9. A process for utilizing waste heat from a system employing oxygen for operation and producing hot gaseous waste products, which comprises passing said hot gaseous products into heat exchange relation with a compressed gas having a boiling point at atmospheric pressure lower than the boiling point of oxygen, said compressed gas flowing in a closed power loop, introducing said hot compressed gas into a prime mover and expanding said compressed gas, cooling said gas, compressing said gas, circulating a part of said compressed gas in a closed refrigeration loop, subjecting said last-named part of said compressed gas to regenerative cooling, expanding a first portion of said cooled compressed gas and cooling same further to a first temperature below the boiling point of oxygen at about atmospheric pressure, passing said first portion of cooled refrigerant in heat exchange relation with air, condensing oxygen from said air, and introducing said oxygen into said system producing said hot gaseous waste products, subjecting the second remaining portion of said cooled compressed gas to further regenerative cooling, expanding the resulting second portion of said cooled compressed gas and cooling same further to a second temperature substantially below said first temperature, passing said second portion of cooled refrigerant into heat exchange relation with a medium associated with said waste heat producing system to cool said medium, utilizing the resulting heated first portion of refrigerant for the first mentioned regenerative cooling of said refrigerant, and utilizing the resulting heated second portion of refrigerant for the second mentioned regenerative cooling of said refrigerant, and recompressing said first and second portions of refrigerant.

10. The process as defined in claim 9, wherein said system is a magnetohydrodynamic power generator, and said medium cooled by said second portion of refrigerant is the magnet coils of said magnetohydrodynamic power generator.

11. The process as defined in claim 10 wherein said gas is helium.

12. A process for utilizing waste heat from a system employing oxygen for operation and producing hot, gaseous waste products, said system including an element requiring cooling at low temperatures for operation thereof, which comprises compressing substantially a gaseous refrigerant medium having a boiling point at about atmospheric pressure lower than the boiling point of oxygen, dividing the compressed medium into a first stream and a second stream, passing said hot gaseous products from said system into heat exchange relation with said compressed first stream to raise the temperature thereof substantially, allowing the heated first stream to expand and deriving mechanical energy therefrom to provide power required to compress the medium, cooling the second stream by regenerative cooling, allowing a first portion of the second stream to expand and deriving mechanical energy therefrom, passing said expanded first portion of said second stream into heat exchange relation with the upper end of an air fractionating zone to remove heat therefrom, supplying heat to the lower end of said fractionating zone, withdrawing oxygen from the lower end of said fractionating zone and introducing said oxygen into said system producing said hot, gaseous waste products, further cooling the second remaining portion of said cooled compressed second stream by regenerative cooling, expanding the resulting second portion of said cooled compressed second stream and cooling same further to a second temperature substantially below said first temperature, passing said second portion of cooled refrigerant into heat exchange relation with a medium associated with said waste heat producing system to cool said medium, utilizing the resulting heated first portion of refrigerant for the first-mentioned regenerative cooling of said refrigerant and utilizing the resulting heated second portion of refrigerant for the second mentioned regenerative cooling of said second portion of refrigerant, and recompressing said first and second portions of refrigerant.

13. A process for utilizing waste heat from a magnetohydrodynamic power generator employing oxygen for operation and producing hot, gaseous waste products, said magnetohydrodynamic power generator including magnet coils requiring cooling at low temperatures for operation thereof, which comprises compressing helium as refrigerant, dividing the compressed helium into a first stream and a second stream, passing said hot gaseous products from said generator into heat exchange relation with said compressed first stream to raise the temperature thereof substantially, allowing the heated first stream to expand and deriving mechanical energy therefrom to provide power required to compress the helium, cooling the second stream by regenerative cooling, allowing a first portion of the second stream to expand and deriving mechanical energy therefrom, passing said expanded first portion of said second stream into heat exchange relation with the upper end of an air fractionating zone to remove heat therefrom, supplying heat to the lower end of said fractionating zone, withdrawing oxygen from the lower end of said fractionating zone and introducing said oxygen into the burner of said magnetohydrodynamic power generator, further cooling the second remaining portion of said cooled compressed second stream by regenerative cooling, expanding the resulting second portion of said cooled compressed second stream and cooling same further to a second temperature substantially below said first temperature, passing said second portion of cooled refrigerant into heat exchange relation with the magnet coils of said magnetohydrodynamic power generator to cool said coils, utilizing the resulting heated first portion of refrigerant for the first-mentioned regenerative cooling of said refrigerant and utilizing the resulting heated second portion of refrigerant for the second mentioned regenerative cooling of said second portion of refrigerant, and recompressing said first and second portions of refrigerant.

14. A system for supplying oxygen and a refrigerant to a unit utilizing same, which includes in combination, a unit which utilizes oxygen and a refrigerant and which produces waste heat in the form of hot combustion gases, a compressor having an exhaust side and intake side, a turbine mechanically connected to drive said compressor, a first expander, a second expander, conduit means extending from the exhaust side to the intake side of the compressor providing a hot circuit for flow of part of the medium leaving the compressor, conduit means extending from the exhaust side to the intake side of the compressor providing a cold circuit for the flow of the remainder of the medium leaving the compressor, said turbine being connected into said hot circuit and said first and second expanders being connected into said cold circuit, heat exchange means for transferring heat from the hot reaction products of said unit producing waste heat to the medium in said hot circuit at a region between the compressor exhaust side and said turbine, a first means between said compressor exhaust side and said first expander in said cold circuit for cooling the medium therein, means for liquefying air and separating oxygen therefrom, said means including a first heat exchanger located between said first expander and the compressor intake side in said cold circuit, conduit means from said air liquefying and separating means to the unit for producing waste heat, for supplying oxygen to said last mentioned unit, a second cooling means between said first cooling means and said second expander in said cold circuit, and a second heat exchanger associated with said waste heat producing unit, said second heat exchanger being located between said second expander and the compressor intake side in said cold circuit.

15. A system as defined in claim 14, wherein said unit is a magnetohydrodynamic power generator.

16. A system for supplying oxygen and a low temperature refrigerant to a unit utilizing same, which includes in combination, a magnetohydrodynamic power generator which utilizes oxygen and a refrigerant and which produces waste heat in the form of hot combustion gases, a compressor having an exhaust side and intake side, a first turbine mechanically connected to drive said compressor, a second turbine, a third turbine, conduit means extending from the exhaust side to the intake side of the compressor providing a hot circuit for flow of part of the fluid medium leaving the compressor, conduit means extending from the exhaust side to the intake side of the compressor providing a cold circuit for the flow of the remainder of the medium leaving the compressor, said first turbine being connected into said hot circuit and second and third turbines being connected into said cold circuit, heat exchange means for transferring heat from the hot reaction products of said magnetohydrodynamic power generator to the medium in said hot circuit at a region between the compressor exhaust side and said first turbine, a first cold regenerator between said compressor exhaust side and said second turbine in said cold circuit, conduit means from said compressor exhaust side to one side of said first cold regenerator, return conduit means from the other side of said first cold regenerator to the intake side of said compressor, an air fractionating tower, a first heat exchanger located in the upper portion of said tower, said heat exchanger being located between said second turbine and the compressor intake side in said cold circuit, conduit means from the lower portion of said tower to said magnetohydrodynamic power generator for supplying oxygen to said generator, a second cold regenerator between said first cold regenerator and said third turbine in said cold circuit, a second heat exchanger associated with said magnetohydrodynamic power generator, said second heat exchanger being located between said third turbine and the compressor intake side in said cold circuit, conduit means from said one side of said first cold regenerator to one side of said second cold regenerator, return conduit means from said second heat exchanger to the other side of said second cold regenerator, and conduit means from the other side of said second cold regenerator to the other side of said first cold regenerator.

References Cited

UNITED STATES PATENTS

| | | | |
|---|---|---|---|
| 2,394,253 | 2/1946 | Nettel et al. | 62—402 X |
| 2,409,159 | 10/1946 | Singleton | 62—402 X |
| 2,458,894 | 1/1949 | Collins | 62—40 X |
| 2,471,123 | 5/1949 | Rouy | 62—402 X |
| 3,234,738 | 2/1966 | Cook | 62—402 |
| 3,239,697 | 3/1966 | Stekly | 310—11 |

FOREIGN PATENTS 1,312,727   1/1962   France.

NORMAN YUDKOFF, *Primary Examiner.*

V. W. PRETKA, *Assistant Examiner.*